United States Patent
Long, III et al.

(10) Patent No.: US 7,421,407 B2
(45) Date of Patent: Sep. 2, 2008

(54) PROCESS AND SYSTEM FOR DETERMINING CORRELATION OF PUBLIC AND PRIVATE MARKETS AND RISK OF PRIVATE MARKETS

(75) Inventors: Austin M. Long, III, Austin, TX (US); Craig J. Nickels, Marble Falls, TX (US)

(73) Assignee: Alignment Capital Group, Austin, TX (US)

( * ) Notice: Subject to any disclaimer, the term of this patent is extended or adjusted under 35 U.S.C. 154(b) by 1226 days.

(21) Appl. No.: 10/077,174

(22) Filed: Feb. 15, 2002

(65) Prior Publication Data
US 2003/0028463 A1 Feb. 6, 2003

Related U.S. Application Data

(60) Provisional application No. 60/269,265, filed on Feb. 15, 2001.

(51) Int. Cl.
*G06Q 40/00* (2006.01)

(52) U.S. Cl. .................................................. 705/36 R
(58) Field of Classification Search ............ 705/35–45, 705/70, 67, 80, 10, 26, 30
See application file for complete search history.

(56) References Cited

U.S. PATENT DOCUMENTS

| | | | | |
|---|---|---|---|---|
| 5,812,987 | A | * | 9/1998 | Luskin et al. .................. 705/36 |
| 6,317,726 | B1 | * | 11/2001 | O'Shaughnessy ............ 705/36 |
| 6,336,102 | B1 | * | 1/2002 | Luskin et al. .................. 705/35 |
| 2001/0034683 | A1 | * | 10/2001 | Ren .............................. 705/35 |
| 2002/0147676 | A1 | * | 10/2002 | Karmali ........................ 705/38 |
| 2002/0194113 | A1 | * | 12/2002 | Lof et al. ....................... 705/37 |
| 2003/0004846 | A1 | * | 1/2003 | Schneider ..................... 705/36 |

* cited by examiner

*Primary Examiner*—R C Weisberger
(74) *Attorney, Agent, or Firm*—Vinson & Elkins LLP

(57) ABSTRACT

Process and system for investing in private portfolio includes determining relative risk, excess return and correlation of a private investment portfolio to a public market.

13 Claims, 1 Drawing Sheet

PROCESS AND SYSTEM FOR DETERMINING CORRELATION OF PUBLIC AND PRIVATE MARKETS AND RISK OF PRIVATE MARKETS

CROSS-REFERENCE TO RELATED APPLICATIONS

This application claims benefit of U.S. Provisional Application No. 60/269,265, filed Feb. 15, 2001.

STATEMENT REGARDING FEDERALLY SPONSORED RESEARCH OR DEVELOPMENT

N/A

BACKGROUND OF THE INVENTION

Correlation

Publications pertaining to the correlation of the public and private markets have used the traditional method of computing correlation: plotting a series of index values $R_M$ (e.g., the return to the S&P 500 index, the Wilshire 5000 index, the NASDAQ composite, etc.) on the x axis and corresponding stock or portfolio values $R_S$ on the y axis, with each pair representing returns for the same time period (daily, monthly, quarterly, annual, etc.). Least squares linear regression of these time series value pairs results in a so-called characteristic line in the form:

$$R_s = \alpha_s + \beta_s R_m + e_s$$

The $\beta$ parameter of the characteristic line, when multiplied by the market return, describes the systematic return of the stock or portfolio. Put another way, the $\beta$ parameter describes the relative riskiness of the investment, as defined by periodic volatility in the value of the stock or portfolio relative to the overall market. The $e_s$ parameter describes the unsystematic return, i.e., the company-specific or portfolio-specific risk of the stock or portfolio. The $\alpha$ parameter is the y-intercept of the characteristic line, a constant that expresses the stock or portfolio return associated with a market return of zero (the return expected if the market does not change).

Beta, the slope of the characteristic line, can also be described in terms of the covariance of the stock and the market:

$$\beta_s = \frac{COV_{sm}}{\sigma_m^2} = \frac{\sigma_s \sigma_m r_{sm}}{\sigma_m^2}$$

Solving for the correlation coefficient of the stock or portfolio, which is a measure of the percentage of movement in the stock or portfolio associated with the movement in the market, we obtain:

$$r_{sm} = \frac{\beta_s \sigma_m^2}{\sigma_s \sigma_m}$$

When applied to stocks or portfolios of listed securities in the public markets, this method of estimating correlation works well. When applied to the private markets, however, this method is inherently biased and inaccurate because the interim value of a private market investment or portfolio (i.e., its value prior to realization) is, by its very nature as an illiquid asset, primarily an appraisal or estimate of value. Much as in the real estate market, values are sticky and thus appear to be less volatile (and therefore less risky) than they might be if an active market established values daily. Portfolio values in the private market are also affected by the j-curve phenomenon, in which fees charged against constant portfolio values result in early negative returns. Whether due to sticky values or the j-curve, the end result is an inaccurate determination of correlation.

For example, several correlation matrices, which include buyouts and venture capital, as well as publicly traded stocks and bonds, are published annually in the Venture Economics Yearbook series. The 2000 Yearbook, which covers private equity through Dec. 31, 1999, contains the following data, reported in FIGS. 9.19 and 9.20.

TABLE 1

Correlation Based on Quarterly Returns for Longest Individual Series*

| | Venture | Buyouts | Mezzanine | Equity | Large Stock | Small Stock | Corp. Bonds | T-Bills | T-Bonds | PVCI |
|---|---|---|---|---|---|---|---|---|---|---|
| Venture | 100.0% | 8.9% | 13.7% | 82.9% | 39.0% | 48.7% | −18.5% | −20.2% | −19.2% | 47.8% |
| Buyouts | | 100.0% | 21.9% | 60.1% | 13.5% | 9.7% | −5.7% | −2.7% | −10.0% | −7.3% |
| Mezzanine | | | 100.0% | 27.3% | 11.9% | 21.6% | −29.0% | −22.4% | −32.6% | 5.6% |
| Equity | | | | 100.0% | 40.8% | 46.5% | −20.3% | −21.3% | −22.9% | 32.2% |
| Large Stock | | | | | 100.0% | 77.7% | 6.8% | 1.3% | 2.6% | 56.6% |
| Small Stock | | | | | | 100.0% | −4.3% | −19.6% | −10.1% | 46.2% |
| Corp. Bonds | | | | | | | 100.0% | 9.7% | 97.5% | 23.8% |
| T-Bills | | | | | | | | 100.0% | 7.5% | −11.5% |
| T-Bonds | | | | | | | | | 100.0% | 17.2% |
| PVCI | | | | | | | | | | 100.0% |
| Beta | 0.80 | 0.84 | 0.93 | 0.43 | 1.00 | 0.50 | 0.27 | — | 0.38 | 0.73 |

*Venture Economics 2000 Yearbook, FIG. 9.19

TABLE 2

Correlation Based on Annual Returns for Longest Series in Common**

|  | Venture | Buyouts | Mezzanine | Equity | Large Stock | Small Stock | Corp. Bonds | T-Bills | T-Bonds | PVCI |
|---|---|---|---|---|---|---|---|---|---|---|
| Venture | 100.0% | −0.9% | −14.4% | 89.1% | 22.3% | 39.7% | −42.4% | −33.5% | −38.0% | 69.8% |
| Buyouts |  | 100.0% | 42.6% | 38.1% | 20.4% | 28.7% | 8.4% | −8.3% | 10.3% | −11.0% |
| Mezzanine |  |  | 100.0% | 6.7% | 0.8% | 8.0% | 32.8% | −9.3% | 39.2% | −13.0% |
| Equity |  |  |  | 100.0% | 27.4% | 50.9% | −42.4% | −48.4% | −36.1% | 60.4% |
| Large Stock |  |  |  |  | 100.0% | 62.6% | 54.9% | 6.1% | 56.7% | 53.6% |
| Small Stock |  |  |  |  |  | 100.0% | 30.9% | −34.2% | 30.4% | 57.7% |
| Corp. Bonds |  |  |  |  |  |  | 100.0% | 40.8% | 98.6% | 5.7% |
| T-Bills |  |  |  |  |  |  |  | 100.0% | 32.8% | 32.8% |
| T-Bonds |  |  |  |  |  |  |  |  | 100.0% | 4.2% |
| PVCI |  |  |  |  |  |  |  |  |  | 100.0% |
| Beta | 0.91 | 0.82 | 0.93 | 0.71 | 1.00 | 0.55 | 0.32 | — | 0.41 | 0.78 |

**(Venture Economics 2000 Yearbook, FIG. 9.20

These two correlation matrices were calculated using the time-weighted rates of return of the securities they contain. They probably understate the correlation of the private markets and the public markets (and of the private markets to each other), as discussed above, because private market valuations stay relatively constant over fairly long periods of time (e.g., most private equity firms hold investments owned less than one year at cost, which is a constant) or decline (because of the j-curve phenomenon), while the market's values rise and fall daily. As a result, correlations looked at over the short run appear to be low—over short time periods the private investment value does not move much in sympathy with the public market, the independent variable—which is why, in the correlation matrices shown above, correlations are much higher over yearly periods (Table 2) than they are over quarterly periods (Table 1).

The best way to remedy these deficiencies of the conventional correlation computation would be to match private market and public market investment outcomes over the same or very similar periods of time, in order to allow the movement of private market values to be realized and thus known with certainty. Realized values are not sticky valuations or biased estimates. They are cash or liquid securities, and thus outcomes that are directly comparable to the liquid alternatives available in an index of listed securities.

Benchmark

The present inventors previously published the Index Comparison Method ("ICM") and developed it into a performance diagnostic. Since its publication, the ICM has been adopted by many of the largest and most sophisticated U.S. and European institutional investors and major consulting firms. The ICM also appears in the Venture Economics annual survey as the BLNC measure (the LN is for Long-Nickels) (2000 Investment Benchmarks Report, Venture, Capital, Venture Economics, Jesse Reyes, Editor in Chief, FIGS. 9.21, 9.22, 9.23 and 9.24).

The ICM is calculated, in simple terms, by the following steps:

1. Compute the internal rate of return of the private investment portfolio,

Obtain private investment asset, vintage and/or overall portfolio actual returns by listing their cash flows in columns, each cash flow accompanied by its date, using natural signs (i.e. cash inflows are positive numbers and cash outflows are negative numbers).

The final cash flow for each investment is its value at the report date (i.e. all valuations are assumed realized at the report date unless they have in fact been realized at an earlier date).

Compute an IRR for the private investment asset, vintage and/or overall portfolios using these cash flows.

2. Compute the comparable total return to an index of public stocks had the cash flows in 1. been invested in the index.

List all cash flows as above for actual portfolio returns, but without showing an ending value/cash flow.

Compute the ending value/cash flow as follows:

(a) Treat the first (negative) cash flow as having been invested in the relevant index.

(b) Using an end-of-period assumption, grow that cash flow over the time between the first and second cash flow at the rates indicated by the linked index.

(c) At the point of the next cash flow, grow the new net amount (i.e. the amount of the prior cash flow grown by the linked index return plus the new cash flow) by the relevant linked index until the date of the next cash flow.

Note that the next cash flow could be a distribution from the private investment, which would be treated as a withdrawal from the index investment. Thus the new net amount could be the amount of the prior cash flow grown by the linked index return minus the new cash flow.

(d) Repeat step (c) until the calculation arrives at the current report date.

(e) Compute the IRR of the investment using the portfolio value at the current report date, as computed in steps (a)-(d), as the final cash flow/valuation as in the actual portfolio return computation above.

The result is a dollar-weighted time-weighted rate of return to the public index that is directly comparable to the IRR performance of the private investment.

The return to the public index represents the opportunity cost of investing in the private markets. This opportunity cost concept can be viewed as a benchmark: if the opportunity cost is a positive number (i.e., $R_M - R_S \geqq 0$), the private investment underperformed the public market; if opportunity cost is a negative number (i.e., $R_M - R_S \leqq 0$)m the private investment outperformed the public market.

SUMMARY

The present disclosure may be described therefore as a system and process for evaluation of private market investments as a part of the investment procedure. The disclosed methods and systems include determining three values of the private investment, the excess return on the private investment over the public market, the risk associated with the return on the private investment relative to the public market and the correlation of the private investment to the public market.

The disclosure may also be described as a process for determining the risk of a private investment portfolio relative to the public market, the correlation of a private investment portfolio to the public market and the excess return of a private market portfolio over the public market by the steps of:

(a) determining the internal rate of return of the private investment portfolio;

(b) determining an index comparison return (ICM) for the private investment portfolio;

(c) plotting the values of (a) and (b) as points in a scatter plot with (a) on the y-axis and (b) on the x-axis and applying least squares linear regression to the resulting plot to yield a linear equation in the form y=βx+α, where β is the slope of the regression line and α is the point at which the regression line crosses the y axis, and a value for $R^2$, the coefficient of determination;

(d) determining the correlation of the private market portfolio with the public market index by taking the square root of the coefficient of determination determined in (c) to yield the coefficient of correlation r (also known in statistical literature as the Greek letter ρ);

(e) determining the risk of the private investment of the portfolio by reference to the risk of the public market portfolio by solving the equation $$\frac{\beta_{vc}\sigma^2_{S\&P}}{r_{VC,S\&P}\sigma_{S\&P}} = \sigma_{VC}; \text{ and}$$

(f) determining the excess return of the private investment portfolio over the public markets by reference to the α of the linear regression line.

The disclosed process may also be used to evaluate the return vs. risk of a private investment portfolio by calculating the Sharpe ratio and comparing the private investment Sharpe ratio to the Sharpe ratio of an appropriate public market.

The disclosure further includes a system for evaluation of private investments including a central processing unit or CPU (processor), which may be a main-frame computer connected to one or more work stations, or it may be a component of a personal computer that may be a "stand alone" computer or it may be networked to other computers though a common server. The system also includes an input device such as a keyboard in communication with the processor, at least one memory source and software including instructions. The device may also include a display device such as a monitor in communication with the processor.

BRIEF DESCRIPTION OF THE DRAWINGS

The following drawing forms part of the present specification and is included to further demonstrate certain aspects of the present invention. The invention may be better understood by reference to this drawing in combination with the detailed description of specific embodiments presented herein.

The Figure is a graph showing the Venture Economics venture capital vintages form 1980 through 1996.

DETAILED DESCRIPTION

Figure 1:
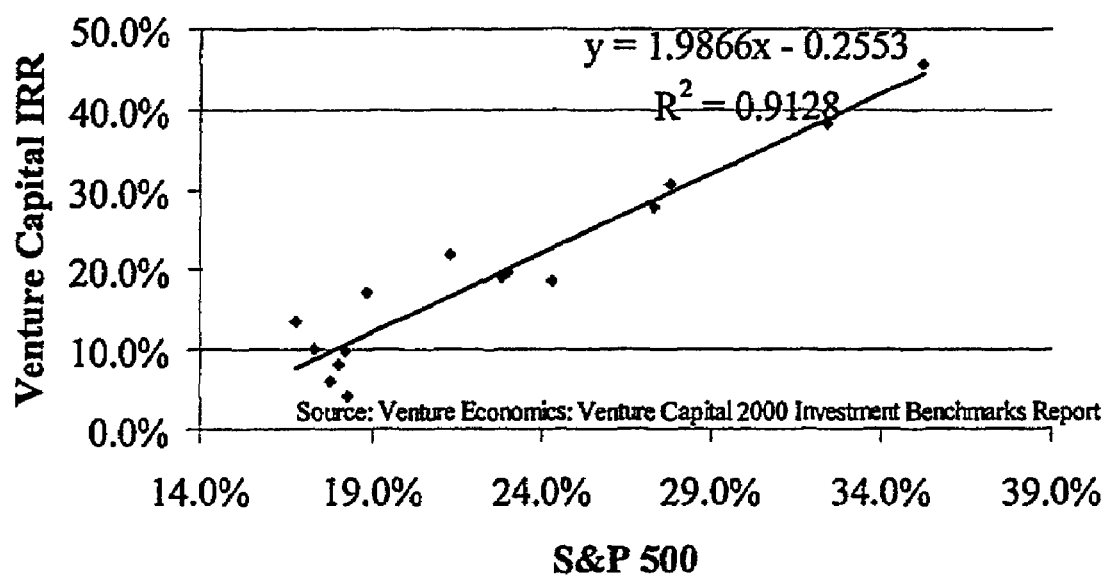

The ICM-based Opportunity Cost Rate of Return Plot Method

An aspect of the present disclosure is a novel analytical method that uses private market and public market returns, made comparable by the ICM, to calculate the correlation of the private and public markets. This analytical method is referred to as the ICM-based opportunity cost rate of return plot. Briefly, the analyst calculates one scatter plot graph point for each investment in the study: the y axis (the dependent variable) is the investment IRR; the x axis (the independent variable) is the ICM. Each ICM value is an unbiased estimate of the public market return outcome that would have been generated by investing in the index rather than in the private investment. In other words, each ICM value represents the public market opportunity cost of the related private investment IRR.

Analogous to the discussion above, least squares linear regression on IRR/ICM scatter point graph points results in a characteristic line in the form:

$$R_s = \alpha_s + \beta_s R_m + e_s$$

The coefficient of correlation can be expressed as:

$$r_{sm} = \frac{\beta_s \sigma^2_m}{\sigma_s \sigma_m}$$

If private investment returns were perfectly correlated with the public markets, each IRR would be equal to its corresponding ICM. The result would be a 45° line beginning at the origin; β would equal 1 and α would equal zero.

An example of a graph as described is shown in the Figure. This analysis in the Figure shows that venture capital, as an asset class, is actually much more highly correlated with the public market than the correlation matrices above might imply, with a high beta (1.99, or almost twice as volatile as the market) and a dismal alpha (−25.5%). Using the characteristic line developed in the least squares linear regression analysis above, the venture capital market could be expected to deliver the following returns, given the market assumption shown:

| Expected S&P 500 | Forecasted Priv. Eq. |
|---|---|
| 6.0% | −13.6% |
| 8.0% | −9.6% |
| 10.0% | −5.7% |
| 12.0% | −1.7% |
| 14.0% | 2.3% |
| 16.0% | 6.3% |
| 18.0% | 10.2% |
| 20.0% | 14.2% |

The overall venture capital market has in fact delivered the returns shown in this table over the 80s and the first half of the 90s. The fast rise of Internet stocks distorted the figures considerably, but the rapid decline experienced by that sector is tending to bring the market back into line with the returns shown in the table.

The following examples show how to calculate the private market portfolio sigma and Sharpe ratio (return per degree of risk), using the private market portfolio IRR/ICM plot linear regression results and the following equation that incorporates these results, as well as known parameters of a publicly investible index over various time periods.

$$\frac{\beta_{vc}\sigma^2_{S\&P}}{r_{VC,S\&P}\sigma_{S\&P}} = \sigma_{VC}$$

TABLE 3

| S&P 500 arithmetic mean 1926-1987*** | | | | 12.0% | | |
| S&P 500 sigma | | | | 21.1% | | |
| Sharpe ratio | | | | | | 0.57 |

| | y = βx + α | | | Calc | | |
| --- | --- | --- | --- | --- | --- | --- |
| | β | α | R² | return | σ_vc | Sharpe |
| Least squares regression of ICM/IRR | 0.032 | 0.1912 | 0.0007 | 0.19504 | 25.5% | 0.76 |

***The data for years 1926-1987 is from Per Ibbotson & Sinquefield, "Stocks, Bonds, Bills and Inflation: Historical Returns (1926-1987)", Dow Jones Irwin 1989, p. 72, Exhibit 19.

TABLE 4

| S&P 500 Arithmetic mean 1926-2000 | | | | 13.0% | | |
| S&P 500 sigma | | | | 20.2% | | |
| Sharpe ratio | | | | | | 0.64 |

| | y = βx + α | | | Calc | | |
| --- | --- | --- | --- | --- | --- | --- |
| | β | α | R² | return | σ_vc | Sharpe |
| Least squares regression of ICM/IRR | 0.032 | 0.1912 | 0.0007 | 0.2 | 24.4% | 0.80 |

TABLE 5

| S&P 500 Arithmetic mean 1988-2000 | | | | 17.6% | | |
| S&P 500 sigma | | | | 15.1% | | |
| Sharpe ratio | | | | | | 1.17 |

| | y = βx + α | | | Calc | | |
| --- | --- | --- | --- | --- | --- | --- |
| | β | α | R² | return | σ_vc | Sharpe |
| Least squares regression of ICM/IRR | 0.032 | 0.1912 | 0.0007 | 0.2 | 18.2% | 1.08 |

These examples demonstrate the ability, based on the present disclosure, to compare the return vs. risk (Sharpe ratio) of a private investment with the Sharpe ratio of a public index. Prior to the present disclosure, the inventors are unaware of any other method to evaluate the comparative risk of a private investment portfolio. In other words, using the ICM computation one could have compared the returns of a private investment to a publicly traded index, but one could not evaluate the amount of risk that the investment represented compared to the risk of investing in a stock index, for example.

Looking at the above examples, in Table 3, a private investment is compared to the S&P 500 index for the years 1926-1987. As can be seen from the table, the return divided by risk was 0.57. In the private investment, the return of about 19.5% was realized with less relative risk than investing in the public index (a Sharpe ratio of 076). The private investments also had a better Sharpe ratio than the public market in Table 4, but were very slightly less in Table 5, when compared to the S&P 500 for the years 1988-2000.

The present disclosure thus contains powerful and novel tools for the evaluation of private investment risk versus the public markets, correlation with the public markets and excess return over the public markets. These tools may be applied to portfolio management and/or investment selection decisions, including by not limited to asset allocation (how much of a portfolio to put into private investments); sub-asset allocation (how much of the private investment portfolio should be in buyouts, venture capital, mezzanine, etc) and evaluation and/or pricing of private investment funds, private investment fund managers, funds of funds, funds of fund managers, portfolios of direct investments, or secondary interests.

What is claimed is:

1. A system for producing a quantitative value for,
   the risk of in a private investment portfolio relative to a public market, the correlation of the private investment portfolio to the public market and the excess return of the private investment portfolio over the public market comprising:
   (a) electronic means for determining an internal rate of return of the private investment portfolio;
   (b) electronic means for determining an index comparison return (ICM) for the private investment portfolio;
   (c) electronic means for determining a private investment characteristic line by plotting the values of (a) and (b) as points in a scatter plot with (a) on the y-axis and (b) on the x-axis and electronic means for applying least squares linear regression to the resulting plot to yield a linear equation in the form y=βx+α, where β is the slope of the regression line and α is the point at which the regression line crosses the y axis, and electronic means for determining a value for $R^2$, the coefficient of determination;
   (d) electronic means for determining the correlation of the private investment portfolio with the public market by taking the square root of the coefficient of determination determined in (c) to yield the coefficient of correlation r;
   (e) electronic means for determining the risk ($\sigma_{vc}$) of the private investment portfolio by reference to the risk of the public market by solving the equation;

$$\frac{\beta_{vc}\sigma^2_{S\&P}}{r_{VC,S\&P}\sigma_{S\&P}} = \sigma_{VC}; \text{ and}$$

(f) electronic means for determining the excess return of the private investment portfolio over the public markets by reference to the α of the linear regression line.

2. The system of claim 1, further including electronic means for determining the Sharpe ratio of the private investment portfolio and comparing the Sharpe ratio of the private portfolio to the Sharpe ratio of the public market.

3. The system of claim 1, wherein said system includes electronic means for application of quantified risk, excess return and correlation of the private investment portfolio to management of an investment portfolio.

4. The system of claim 1, wherein said system includes electronic means for application of quantified risk, excess return and correlation of the private investment portfolio to selection of one or more investments.

5. The system of claim 1, wherein said system includes electronic means for application of quantified risk, excess return and correlation of the private investment portfolio to asset allocation into a private investment.

6. The system of claim 1, wherein said system includes electronic means for application of quantified risk, excess return and correlation of the private investment portfolio to sub-asset allocation within the private investment portfolio.

7. The system of claim 1, wherein said system includes electronic means for application of quantified risk, excess return and correlation of the private investment portfolio to pricing of private investment funds.

8. The system of claim 1, wherein said system includes electronic means for application of quantified risk, excess return and correlation of the private investment portfolio to evaluation of private investment funds.

9. The system of claim 1, wherein said system includes electronic means for application of quantified risk, excess return and correlation of the private investment portfolio to evaluation of a private investment fund manager.

10. The system of claim 1, wherein said system includes electronic means for application of quantified risk, excess return and correlation of the private investment portfolio to evaluation of funds of funds.

11. The system of claim 1, wherein said system includes electronic means for application of quantified risk, excess return and correlation of the private investment portfolio to evaluation of a fund of fund managers.

12. The system of claim 1, wherein said system includes electronic means for application of quantified risk, excess return and correlation of the private investment portfolio to evaluation of a portfolio of direct investments.

13. The system of claim 1, wherein said system includes electronic means for application of quantified risk, excess return and correlation of the private investment portfolio to evaluation of secondary interests.

* * * * *